United States Patent Office 3,444,893
Patented May 20, 1969

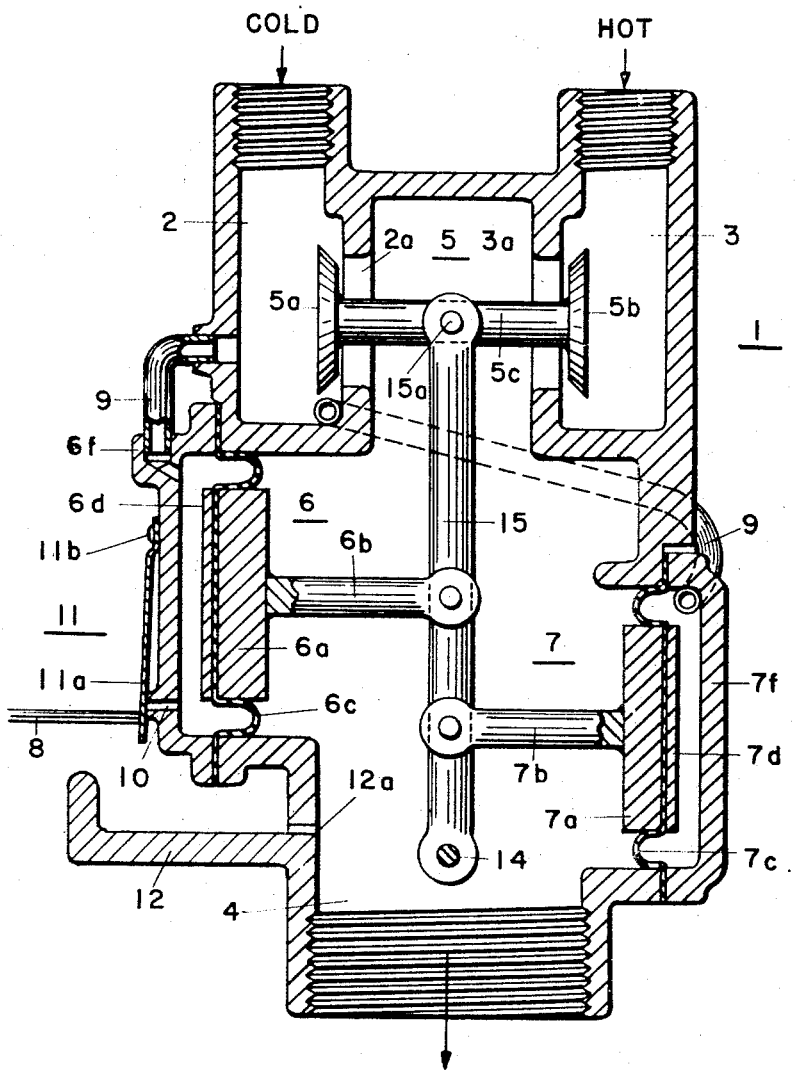

3,444,893
SERVOCONTROLLED DUAL FLUID MIXING
VALVE HAVING A PAIR OF ACTUATING
PISTONS
John F. Taplin, 15 Sewall St.,
West Newton, Mass. 02165
Filed July 11, 1966, Ser. No. 564,384
Int. Cl. G05d 11/16; F16k 11/04, 31/165
U.S. Cl. 137—625.4                                     3 Claims

ABSTRACT OF THE DISCLOSURE

A servocontrolled mixing valve includes a pair of separate fluid motors both energized by one of the two fluids to be mixed which operate movable valve element means by the intermediary of a pivotable valve-operating lever.

This invention relates generally to automated control of the flow of fluids. The term fluids, as used in this context, is intended to encompass both gaseous and liquid media.

In automated process control the problem arises frequently of mixing fluids in accordance with a variable ratio, which ratio is determined by the condition of a sensing element. Such a sensing element may be responsive to temperature, pressure, flow-velocity, or to any other conceivable parameter.

It is another object of this invention to provide an automatic mixing valve of utmost simplicity, capable of solving the above problem, which valve is highly reliable in its operation and inexpensive to manufacture.

Another object of this invention is to provide a dual fluid mixing valve for mixing two fluids in a variable ratio, which ratio depends upon the condition of a sensing element by which the fluid mixing valve is controlled, which mixing valve includes movable valve element means by whose movement the aforementioned ratio is changed and which valve element means is operated, or actuated, by the energy inherent in one of the two fluids to be mixed.

Still another object of this invention is to provide a mixing valve having the aforementioned performance characteristics wherein the movable fluid-ratio-changing valve element means is operated, or actuated, by fluid motor means operated by the pressure inherent in one of the two fluids to be mixed.

For a better understanding of the present invention, together with other objects thereof, reference may be had to the following description, taken in connection with the accompanying drawing, and its scope will be pointed out with particularity in the appended claims.

Referring now to the drawing which shows a vertical section of a dual fluid mixing valve embodying this invention, reference numeral 1 has been applied to generally indicate a fluid passageway structure. Fluid passageway structure 1 defines the fluid admission passageways 2 and 3, and the fluid outlet passageway 4. Fluid-admission passageways 2 and 3 each have a port 2a and 3a, respectively, to outlet passageway 4. Reference numeral 5 has been applied to generally indicate movable valve element means arranged inside of passageway structure 1 controlling the effective areas of ports 2a, 3a from passageways 2, 3 to passageway 4 and inversely changing by the movement thereof said effective areas of ports 2a and 3a. The aforementioned valve element means 5 includes two separate valve elements 5a, 5b supported by a common stem or tie rod 5c. When the unit 5a, 5b, 5c is moved from left to right the effective area of port 2a is decreased and the effective area of port 3a increased. On the other hand, when the unit 5a, 5b, 5c is moved from right to left, the effective area of port 2a is increased and the effective area of port 3a decreased.

Valve element means 5 is operatively related to fluid motor means supplied with fluid under pressure from one of passageways 2 or 3. The fluid motor means are in the form of two separate cylinder-piston type fluid motors generally indicated by reference numerals 6, 7. Reference numeral 8 has been applied to indicate a control-signal-transmitting element which, for example, may be in the form of a rod for transmitting to the aforementioned fluid motor means 5 control signals to control the operation of said fluid motor means 5 in accordance with said control signals. The end of element or rod 8 remote from fluid motor means 5 may be operatively related to any sensing element, e.g. a temperature responsive sensing element, or a pressure responsive sensing element, or any other sensor for determining some operating conditions in a quantitative way. It may, for instance, be desirable to maintain in outlet passageway a predetermined fixed temperature obtained by mixing a relatively cold fluid admitted through passageway 2 and relatively hot fluid admitted through passageway 3. In that instance a bimetal thermometer, or a bourdon tube thermometer, may be arranged in such a way that it is exposed to the temperature of the fluid in passageway 4 and controls element or rod 8 in accordance with that temperature, i.e. moving that element or rod in a direction longitudinally thereof to the left concomitant with a relative change of temperature in one direction, and moving that element or rod to the right concomitant with a relative change of temperature in the other direction. Control signal transmitting element 8 may include remote control means for transmission of a measured value of a quantity or condition subject to change with time.

Fluid motor 6, 7 are substantially identical, one of these fluid motors 6 being arranged at the left side and the other of these fluid motors 7 at the right side of fluid passageway structure 1. The left fluid motor 6 includes a piston 6a, a piston rod 6b, and a rolling diaphragm 6c having a radially inner clamping flange clamped by clamping plate 6d against an end surface of piston 6a. This may be achieved by means of fasteners, e.g. screws, projecting transversely through clamping plate 6d into piston 6a. Reference numeral 6f has been applied to indicate a cover defining a fluid motor cylinder and including a flange for clamping in position the radially outer clamping flange of rolling diaphragm 6c. Rolling diaphragm 6c includes a rolling wall which is convoluted, or U-shaped, and arranged inside of a toroidal gap defined by piston 6a and its cooperating cylinder walls. The right fluid motor 7 includes a piston 7a, a piston rod 7b, and a rolling diaphragm 7c having a radially inner clamping flange clamped by clamping plate 7d against an end surface of piston 7a. Reference numeral 7f has been applied to indicate a cover defining a fluid motor cylinder and including a flange for clamping in position the radially outer clamping flange of rolling diaphragm 7c. Rolling diaphragm 7c includes a rolling wall which is convoluted, or U-shaped, and arranged inside of a toroidal gap defined by piston 7a and its cooperating cylinder walls. The two fluid motors 6, 7 are adapted to be operated by fluid under pressure derived from passageway 2. Reference numeral 9 has been applied to indicate conduit means or restricted feed tubes for supplying fluid motors 6 and 7 with fluid under pressure. The left feed tube 9 interconnects passageway 2 and the cylindrical space to the left of piston 6a, and the right feed tube 9 interconnects passageway 2 and the cylindrical space to the right of piston 7a. The effective cross-sectional area of feed tubes 9 is not affected by the position of control-signal-transmitting element 8, and is constant. Cover 6f is provided with a passageway 10 for releasing fluid under pressure from the cylindrical space situated to the left of the left end surface of piston 6a to a space wherein a smaller pressure prevails than inside of fluid motor 6, or inside of the cylinder space thereof. The fluid release or fluid dumping passageway 10 includes a servo valve generally indicated at 11 under the control of control-signal-transmitting element or rod 8. Servo valve 11 is formed by a flexible-strip-controlled nozzle. To be more specific, servo valve 11 includes a flexible strip or reed 11a affixed at 11b to cover 6f whose end remote from point 11b is moved to the left and to the right by the action of control-signal-transmitting element 8. The lower end of flexible strip or reed 11a controls the effective area of the downstream orifice of passageway 10, and thus controls the degree of fluid under pressure which is being dumped from fluid motor 6 by the action of control-signal-transmitting element 8. Reference numeral 12 has been applied to indicate a receptacle, or tray, arranged below the downstream orifice of passageway 10 for receiving fluid in liquid form, e.g. condensate, dumped from fluid motor 6. The lateral wall defining passageway 4 is provided with a draining hole 12a for draining liquid collected in receptacle or tray 12 into passageway 4.

The ends of piston rods 6b, 7b remote from pistons 6a, 7a are pivotally connected to a rocking lever 15 pivotally supported at 14 by structure 1. The upper end of rocking lever 15 is journalled at 15a to valve stem 5c.

Assuming that the pressure on pistons 6a, 7a is equal, and thus the thrust of piston rods 6b, 6c against rocking lever 15 equal but opposite. As a result, valve means 5 tends to be pivoted in clockwise direction about fulcrum 14 since the mechanical advantage of piston rod 6b exceeds that of piston rod 7b. In order to establish the same torque by piston rods 6b, 7b upon rocking lever 15 servo valve 11 must allow a predetermined leakage from the cylinder space of left fluid motor 6. Any increase in the amount of fluid dumped by servo valve 11 from fluid motor 6 results in a decrease of the clockwise torque exerted by piston rod 6b upon rocking lever 15 and consequently in a tendency of rocking lever 15 to pivot in counterclockwise direction about fulcrum 14. On the other hand, any decrease in the amount of fluid dumped by servo valve 11 from fluid motor 6 results in an increase of the clockwise torque exerted by piston 6b upon rocking lever 15, and consequently in a tendency of rocking lever 15 to pivot in clockwise direction. This, in turn, reduces the ratio of fluid admitted from passageway 2 to fluid admitted from passageway 3 to passageway 4.

It will be apparent from the foregoing that servo valve 11 is a part of a conventional feed-back system which has not been shown in the drawing.

I claim as my invention:

1. A servocontrolled dual fluid mixing valve for mixing two fluids in accordance with a variable ratio determined by the action of a sensing element comprising:
   (a) a fluid passageway structure defining a pair of fluid admission passageways and defining an outlet passageway, each of said pair of fluid admission passageways having a port to said outlet passageway;
   (b) movable valve element means arranged inside said passageway structure controlling the effective area of said port to said outlet passageway of each of said pair of fluid admission passageways and inversely changing by the movement thereof said effective area of said port to said outlet passageway of each of said pair of fluid admission passageways;
   (c) a pair of separate fluid motors for operating said valve element means;
   (d) a pivotable valve-operating lever tied to said valve element means operatively related to said pair of separate fluid motors;
   (e) a control-signal-transmitting element for transmitting to one of said pair of separate fluid motors control signals emitted from a sensing element to control the operation of said one of said pair of separate fluid motors in accordance with said control signals;
   (f) a pair of duct-defining means unaffected by said control-signal-transmitting element for supplying fluid under pressure from one of said pair of fluid-admission passageways to each of said pair of separate fluid motors; and
   (g) second conduit means including a servo valve under the control of said control-signal-transmitting element for dumping fluid under pressure from said one of said pair of separate fluid motors into a space wherein a lower pressure prevails than inside said pair of separate fluid motors.

2. A mixing valve as specified in claim 1 wherein said servo valve includes a flexible strip having a fixed end and a movable end remote from said fixed end, said movable end controlling dumping of fluid under pressure through said second conduit means.

3. A mixing valve as specified in claim 1, wherein each of said pair of separate fluid motors is substantially identical, wherein each of said separate pair of fluid motors includes a piston rod pivotally connected to said valve-operating-lever, and wherein the mechanical advantage of the piston rod of said one of said pair of separate fluid motors exceeds the mechanical advantage of the piston rod of the other of said pair of separate fluid motors.

References Cited
UNITED STATES PATENTS

| | | |
|---|---|---|
| 2,449,766 | 9/1948 | Brown. |
| 2,550,907 | 5/1951 | Brown. |
| 2,907,340 | 10/1959 | Kenney _____ 251—45 X |
| 3,200,838 | 8/1965 | Sheaffer _____ 251—368 X |

FOREIGN PATENTS

| | | |
|---|---|---|
| 553,373 | 5/1943 | Great Britain. |
| 209,075 | 3/1960 | Austria. |

M. CARY NELSON, *Primary Examiner.*

J. R. DWELLE, *Assistant Examiner.*

U.S. Cl. X.R.

137—624.11; 236—12; 251—28